United States Patent
Chen et al.

(10) Patent No.: US 10,274,942 B2
(45) Date of Patent: Apr. 30, 2019

(54) METHOD FOR DETERMINING ABNORMAL EQUIPMENT IN SEMICONDUCTOR MANUFACTURING SYSTEM AND PROGRAM PRODUCT

(71) Applicant: United Microelectronics Corp., Hsinchu (TW)

(72) Inventors: Liu-Lian Chen, Shanghai (CN); Xian-Feng Du, Singapore (SG); Guo-Hai Zhang, Singapore (SG)

(73) Assignee: United Microelectronics Corp., Hsinchu (TW)

( * ) Notice: Subject to any disclaimer, the term of this patent is extended or adjusted under 35 U.S.C. 154(b) by 27 days.

(21) Appl. No.: 15/476,762

(22) Filed: Mar. 31, 2017

(65) Prior Publication Data

US 2018/0239340 A1 Aug. 23, 2018

(30) Foreign Application Priority Data

Feb. 17, 2017 (TW) .............................. 106105298 A

(51) Int. Cl.
*G05B 19/418* (2006.01)
*G07C 3/14* (2006.01)

(52) U.S. Cl.
CPC .......... *G05B 19/4184* (2013.01); *G07C 3/14* (2013.01); *G05B 2219/32191* (2013.01); *G05B 2219/45032* (2013.01); *Y02P 90/02* (2015.11); *Y02P 90/14* (2015.11)

(58) Field of Classification Search
CPC ...... G05B 19/4184; G05B 2219/32222; G05B 2219/45031; Y02P 90/14
See application file for complete search history.

(56) References Cited

U.S. PATENT DOCUMENTS

| 5,712,185 | A | * | 1/1998 | Tsai ........................ H01L 21/32 257/E21.258 |
| 6,066,886 | A | * | 5/2000 | Egawa ................ H01L 27/0207 257/620 |
| 6,973,390 | B2 | | 12/2005 | Chang |
| 9,158,867 | B2 | | 10/2015 | Lin et al. |
| 2008/0232670 | A1 | | 9/2008 | Li et al. |

* cited by examiner

*Primary Examiner* — Elias Desta
(74) *Attorney, Agent, or Firm* — J.C. Patents

(57) ABSTRACT

A method for determining abnormal equipment in semiconductor manufacturing system includes processing wafers. A measurement data relating to wafers at respective processing steps and at each tool stack run count for respective tools is provided. The method also includes performing statistical and correlation analysis on the production history data and the measurement data to determine multiple parameters including bad ratio (Rb) and good ratio (Rg) for each tool. A first bad-to-good probability ratio (R1) for each tool is obtained by dividing Rb by Rg at the tool stack run count. A second bad-to-good probability ratio (R2) of each tool is an overall probability ratio of Rb to Rg of each tool. A first correlation coefficient (C1) is provided for the measurement data corresponding to the tool stack run count. A second correlation coefficient (C2) is provided for the first bad-to-good probability ratio (R1) corresponding to the tool stack run count.

16 Claims, 2 Drawing Sheets

METHOD FOR DETERMINING ABNORMAL EQUIPMENT IN SEMICONDUCTOR MANUFACTURING SYSTEM AND PROGRAM PRODUCT

CROSS-REFERENCE TO RELATED APPLICATION

This application claims the priority benefit of Taiwan application serial no. 106105298, filed on Feb. 17, 2017. The entirety of the above-mentioned patent application is hereby incorporated by reference herein and made a part of this specification.

BACKGROUND OF THE INVENTION

1. Field of the Invention

The invention relates to a semiconductor manufacturing technique, and particularly relates to a method for determining abnormal equipment in a semiconductor manufacturing system and a program product.

2. Description of Related Art

When being manufactured, semiconductor products are normally arranged in lots in order for mass production. Each of the lots includes a plurality of wafers for forming semiconductor devices as desired on the wafers. Eventually, a plurality of chips that are not yet packaged are manufactured. Manufacturing of the wafers involves a plurality of processing steps. In each of the steps, a plurality of tools (also referred to as machines) are correspondingly used.

However, different tools of the same type may be used at the same step for different lots. Generally, the manufacturing performance of the respective tools may not be the same, and the performance may also differ in different manufacturing processes. When the performance of the tool is not as desired, the yield rate may decrease. In the case that the yield rate decreases, the tool that possibly contributes to the decrease needs to be found in order to facilitate the yield rate. However, the amount of data of the manufacturing history including the tools used and the processing steps carried out is huge. Conventionally, the tool that possibly contributes to the decrease in yield rate is manually determined directly based on edited/combined production data. However, if the data of the manufacturing history are not analyzed effectively, it may be difficult to decide and look for the potentially problematic tool in an efficient manner.

Issues that need to be considered in production control includes how to systematically analyze the association between the manufacturing history and inspection data, so as to come up with various factors that possibly contribute to the decrease in yield rate.

SUMMARY OF THE INVENTION

The invention provides a method for determining abnormal equipment of a semiconductor manufacturing system and a program product. A statistical analysis based on data of manufacturing history and measurement data of products are carried out systematically. In addition, a plurality of statistical parameters of a plurality of tools are considered, and a correlation analysis is systematically conducted. Furthermore, tools are ranked based on a plurality of factors for a subsequent judgment.

The invention also takes an effect of tool stack run count into consideration, so as to make the performance of a problematic tool more salient after multiple times of use due to an additive effect, so as to more accurately find out a tool that causes a decrease in yield rate.

According to an embodiment of the invention, a method for determining abnormal equipment in a semiconductor manufacturing system includes processing a plurality of wafers, wherein each of the wafers undergoes a plurality of processing steps, each of the processing steps involves a plurality of processing tools, and each of the wafers is processed by at least one of the processing tools involved in the processing steps. The method also includes providing production history data associated with the respective tools processing the respective wafers at the respective processing steps and providing at least one measurement data relating to the wafers at the respective processing steps and at each tool stack run count for the respective tools. A statistical and correlation analysis on the production history data and the measurement data is carried out to determine a plurality of parameters. The parameters include: a bad ratio (Rb) and a good ratio (Rg) of each of the tools, a first bad-to-good probability ratio (R1) of each of the processing tools obtained by dividing Rb by Rg at the tool stack run count, a second bad-to-good probability ratio (R2) as an overall probability ratio of Rb to Rg of each of the processing tools, a first correlation coefficient (C1) for the measurement data corresponding to the tool stack run count; and a second correlation coefficient (C2) for R1 corresponding to the tool stack run count. The processing tools are ranked based on performance. The performance includes an index value relating to each of the processing steps based on a function of the parameters and R1 is incorporated into C2.

According to an embodiment of the invention, in the method, the measurement data include chip probing (CP) measurement data or wafer acceptance test (WAT) measurement data.

According to an embodiment of the invention, in the method, the index value is calculated based on a function as follows:

$$\frac{Rg/0.5}{[(1+|C1|/0.1)\cdot(1+C2/0.1)\cdot R2]^{Rb/0.5}}$$

According to an embodiment of the invention, in the method, Rb and Rg correspond to a bad group and a good group, the measurement data of the bad group fall on a first side in a measurement distribution of the statistical and correlation analysis, whereas the measurement data of the good group fall on a second side in the measurement distribution of the statistical and correlation analysis.

According to an embodiment of the invention, in the method, the processing tools are filtered based on Rb or Rg to reduce the number of the processing tools involved in the ranking.

According to an embodiment of the invention, in the method, the processing tools are filtered out when a condition of R2<R1 is met to reduce the number of the processing tools involved in the ranking.

According to an embodiment of the invention, in the method, any of the processing tools whose value of C2 is smaller than or equal to 0 is filtered out.

According to an embodiment of the invention, the method further includes that the semiconductor manufacturing system suspends the processing tool whose performance is determined as bad based on the ranking of performance.

An embodiment of the invention provides a program product configured to exert semiconductor processing control and including a non-transitory computer-readable medium storing a program. In addition, a plurality of wafers are processed, each of the wafers undergoes a plurality of processing steps, each of the processing steps involves a plurality of processing tools, and each of the wafers is processed by at least one of the processing tools involved in the processing steps. The program product includes a computer program configured to carry out: obtaining production history data associated with the respective tools processing the respective wafers at the respective processing steps. Also, at least one measurement data relating to the wafers at the respective processing steps and at each tool stack run count of the respective tools is obtained. A statistical correlation analysis on the production history and the measurement data is carried out to determine the parameters including the bad ratio (Rb) and the good ratio (Rg) of each of the tools, a first bad-to-good probability ratio (R1) of each of the processing tools obtained by dividing Rb by Rg at the tool stack run count, and a second bad-to-good probability ratio (R2) as an overall ratio of the Rb to the Rg of each of the processing tools. A first correlation coefficient (C1) is provided for the measurement data corresponding to the tool stack run count. A second correlation coefficient (C2) is provided for the first bad-to-good probability ratio (R1) corresponding to the tool stack run count. The processing tools are ranked based on the performance. The performance is the index values relating to the respective processing steps based on the function of the parameters. In addition, R1 is incorporated into C2.

According to an embodiment of the invention, in the program product, the measurement data include chip probing (CP) measurement data or wafer acceptance test (WAT) measurement data.

According to an embodiment of the invention, in the program product, the index value is calculated based on a function as follows:

$$\frac{Rg/0.5}{[(1+|C1|/0.1)\cdot(1+C2/0.1)\cdot R2]^{Rb/0.5}}$$

According to an embodiment of the invention, in the program product, the measurement data of the bad group fall on a first side in a measurement distribution of the statistical and correlation analysis, whereas the measurement data of the good group fall on a second side in the measurement distribution of the statistical and correlation analysis.

According to an embodiment of the invention, in the program product, the processing tools are filtered based on Rb or Rg to reduce the number of the processing tools involved in the ranking.

According to an embodiment of the invention, in the program product, the processing tools are filtered out when a condition of R2<R1 is met to reduce the number of the processing tools involved in the ranking.

According to an embodiment of the invention, in the program product, any of the processing tools whose value of C2 is smaller than or equal to 0 is filtered out.

According to an embodiment of the invention, the processing tool whose performance is determined as bad based on the ranking of performance is suspended.

Based on the above, the invention takes an effect of tool stack run count into consideration, so as to make the performance of a problematic tool more salient after multiple times of use due to an additive effect, so as to more accurately find out a tool that causes a decrease in yield rate.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
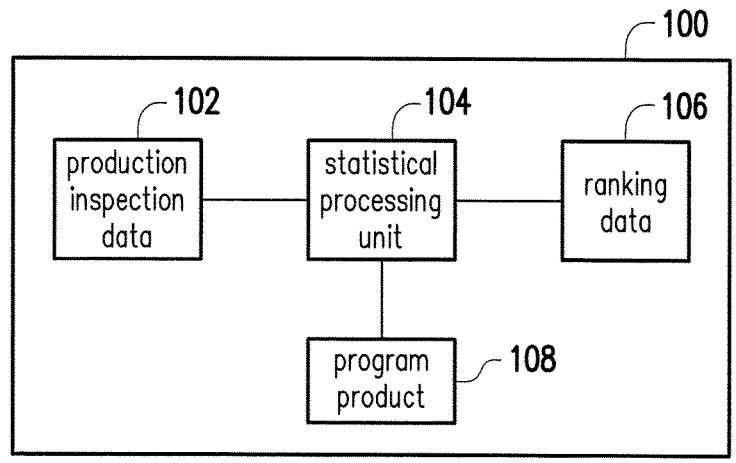
FIG. 1 is a schematic view illustrating a semiconductor processing control system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

The invention relates to a method for determining abnormal equipment in a semiconductor manufacturing system and a program product. In the invention, a statistical analysis based on the data of the manufacturing history and the measurement data of the products are carried out systematically. In addition, a plurality of statistical parameters of a plurality of tools is considered, and a correlation analysis is systematically conducted. Then, based on an objective analysis on the performance of tools, the tools are ranked for subsequent decision making based on the chances of causing a decrease in yield rate.

In the following, some embodiments are provided to describe the invention, but the invention is not limited to the embodiments described herein.

FIG. 1 is a schematic view illustrating a semiconductor processing control system according to an embodiment of the invention. Referring to FIG. 1, a method for determining abnormal equipment of a semiconductor manufacturing system and a program product may be carried out by a semiconductor processing control system 100. The semiconductor processing control system 100 is a computer system, for example, and may obtain a program stored in the program product from the program product, so as to carry out the method for determining abnormal equipment of the semiconductor manufacturing system.

The semiconductor processing control system 100 may obtain a program as desired from a program product 108. In addition, the semiconductor processing control system 100 includes a receiving interface, for example, so as to receive an input production inspection data 102. The semiconductor processing control system 100 further includes a statistical processing unit 104 that conducts a statistical analysis on the input production inspection data 102 and thus obtains a ranking data 106. The ranking data 106 includes a performance ranking on the chance of causing an abnormal product analyzed and estimated based on the tools used in correspondence with the processing steps using the tools.

Figure 2:
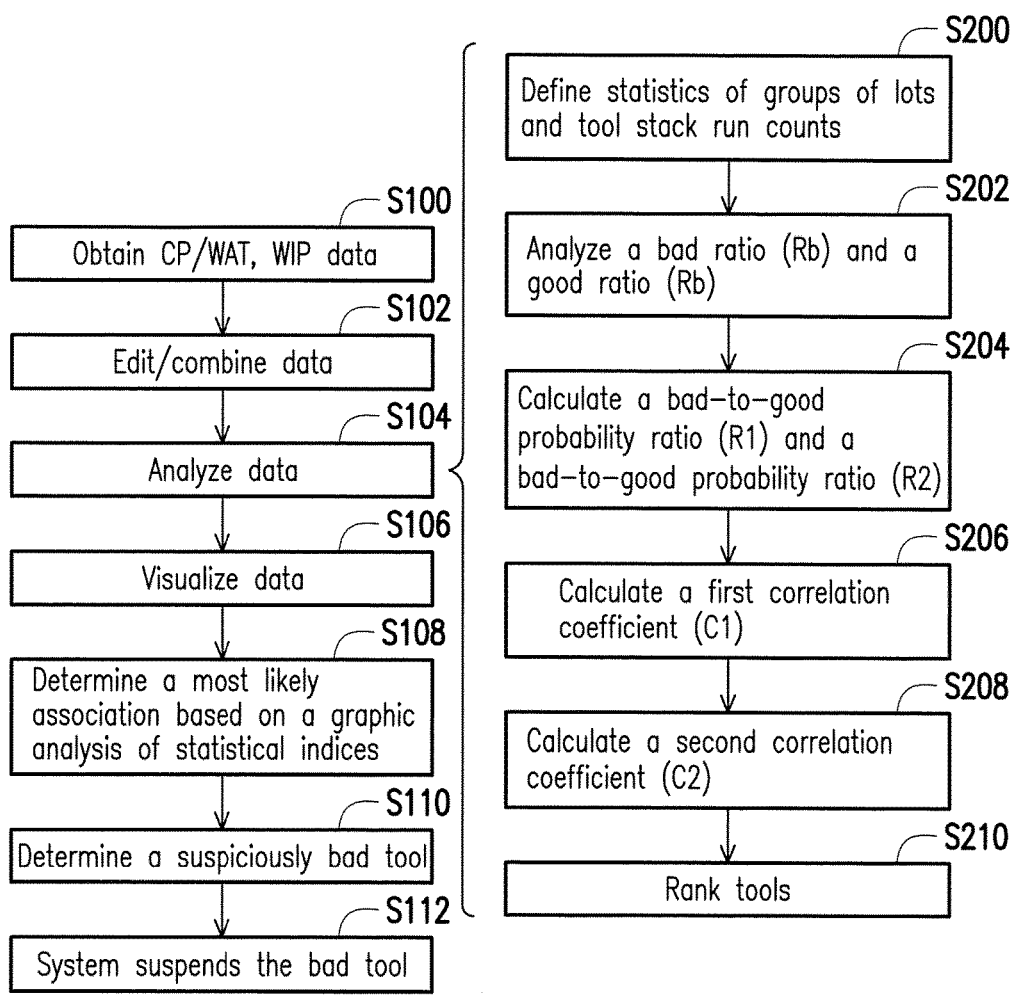
FIG. 2 is a schematic view illustrating a method for determining abnormal equipment of a semiconductor manufacturing system according to an embodiment of the invention.

In the following, an embodiment is provided to describe the method for determining abnormal equipment of the semiconductor manufacturing system. However, the invention is not limited to the embodiment described herein. FIG. 2 is a schematic view illustrating a method for determining abnormal equipment of a semiconductor manufacturing system according to an embodiment of the invention.

Referring to FIG. 2, the method for determining abnormal equipment of the semiconductor manufacturing system includes Step S100. At Step S100, production history data, such as chip probing (CP) measurement data, wafer acceptance test (WAT) measurement data, wafer-in-process (WIP) data, or the like are obtained. After the data are obtained at Step S100, the data are edited/combined at Step S102. For example, the data are the links associating with lot numbers, processing steps, tools used, and so on.

According to the embodiment of the invention, a data analysis is carried out at Step S104. Specifically, some statistical methods are adopted to analyze the data. Details in this respect will be further described in the subsequent paragraphs. At Step S104 in the embodiment of the invention, the performance of the tools is evaluated, and the tools are ranked through an objective systematic analysis.

Thus, if Step S104 is omitted and subsequent Steps S106, S108, and S110 are directly carried out, it may be more difficult to accurately find out a tool that possibly contributes to a decrease in yield rate and a processing step involving the tool.

In the following, Step S104 is described in greater detail. Step S104 includes Step S200 to Step S210. At Step S200, statistics of groups of lots and tool stack run counts are defined. In other words, the lots are respectively classified based on the tool stack run counts in addition to being associated with the tools used and the corresponding processing steps. For example, a product may normally undergo a plurality of etching processes, and etching tools used in the respective etching processes may be the same or different. Even if the same etching tool is used, the number of times of using the tool is also specified. The tool stack run count serves to specify the number of times of using the etching tool.

If the performance of the etching tool is not in good condition, it is expected that the yield rate of products may decrease after the tool is used a plurality of times. In the method described in the following, such case may be found through analysis, so as to find out a suspicious tool.

At Step S202, a bad ratio (Rb) and a good ratio (Rg) are analyzed. A value of Rb is a ratio of bad products to all products in connection with the tool in the overall manufacturing determined based on a statistical distribution. A value of Rg is a ratio of good products to all products in connection with the tool in the overall manufacturing determined based on a statistical distribution.

At Step S204, a bad-to-good probability ratio (R1) and a bad-to-good probability ratio (R2) are calculated. A value of R1 is defined as a probability ratio of Rb to Rg calculated in correspondence with the tool stack run count, namely a value of Rb/Rg corresponding to the tool and based on the tool stack run count. A value of R2 is defined as a probability ratio of Rb to Rg calculated in correspondence with overall statistics, namely an overall value of Rb/Rg corresponding to the tool. At Step S206, a first correlation coefficient (C1) is calculated. A value of C1 is defined as the first correlation coefficient C1 for measurement data, such as a CP/WAT value, corresponding to the tool stack run count. At Step S208, a second correlation coefficient (C2) is calculated. A value of C2 is defined as a second correlation coefficient for R1 corresponding to the tool stack run count.

At Step S210, the tools are ranked based on the parameters of Rb, Rg, R1, R2, C1, and C2. Here, R1 is already incorporated into C2. An order of the ranking of the tools is based on index values of the ranking. The index value is a function of the parameters Rb, R1, R2, C1, and C2, such as an Index calculated based on Formula (1).

$$\text{Index} = \frac{Rg/0.5}{[(1 + |C1|/0.1) \cdot (1 + C2/0.1) \cdot R2]^{Rb/0.5}} \quad (1)$$

After multiple times of validation, Formula (1) is found to be able to effectively reflect the performance. Specifically, a smaller value predicts worse performance as expected. However, the invention is not limited to Formula (1). The values of the parameters may be varied, or other functions may also be adopted for estimation. The parameters mainly include factors relating to the tool stack run count. When the tool is deteriorated, through the analysis on tool stack run count, a tendency of deterioration may be detected. Therefore, the suspicious tool may be found more accurately.

Moreover, to reduce the volume of the statistical data, a tool with desirable performance may be filtered out in advance based on the values of Rb, Rg, C1, and C2. In an embodiment, Rb and Rg correspond to a bad group and a good group, for example. In addition, the measurement data of the bad group fall on a first side in a measurement distribution of the statistical and correlation analysis, whereas the measurement data of the good group fall on a second side in the measurement distribution of the statistical and correlation analysis. In an embodiment, in the method, for example, the processing tools are filtered out when a condition of R2<R1 is met in order to reduce the number of the processing tools involved in the ranking. In an embodiment, any of the processing tools whose value of C2 is smaller than or equal to 0 may be filtered out, for example.

Through the analysis of ranking, the structure of data may be arranged in a form shown in Table 1, so as to list a possible ranking of the tools analyzed. The data structure shown in Table 1 is merely an example of form, and the invention is not limited to a specific form of presenting the data.

TABLE 1

| Factor | C1 | C2 | Rb | Rg | R2 | Index | Position in ranking |
|---|---|---|---|---|---|---|---|
| | x | x | x | x | x | x | 0.00106 | 1 |
| | x | x | x | x | x | x | 0.00109 | 2 |
| | x | x | x | x | x | x | x | 3 |

After Step S104 is finished, the data in Table 1, for example, are displayed at Step S106 for data visualization. At Step S108, the data displayed, such as the data in Table 1, may help the control personnel determine the most likely correlation based on a graphic analysis of the statistical indices. It should be noted that the highest ranked position indicates "most likely" but not "absolutely". At Step S110, since the data as shown in Table 1 are generated in the embodiment of the invention, the control personnel may determine the suspicious tool and the processing step involving the tool based on the data and his/her experience. At Step S112, the system suspended a bad tool, i.e., a tool that is determined to possibly decrease the yield rate.

Figure 3:
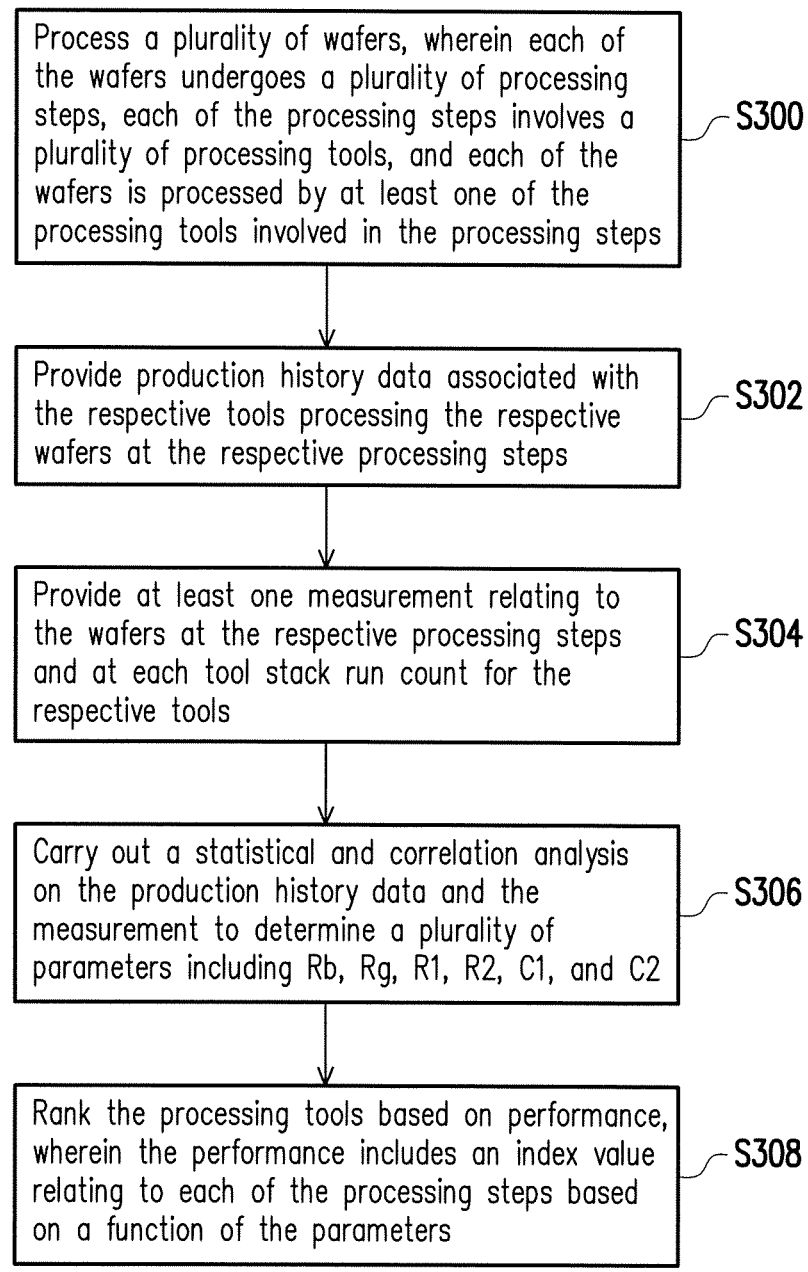
FIG. 3 is a schematic view illustrating a method for determining abnormal equipment of a semiconductor manufacturing system according to an embodiment of the invention.

The statistical analysis of the system according to the embodiment of the invention further includes the factor of tool stack run count to make a more accurate prediction. FIG. 3 is a schematic view illustrating a method for determining abnormal equipment of a semiconductor manufacturing system according to an embodiment of the invention.

Referring to FIG. 3, a plurality of wafers is processed at Step S300. Each of the wafers undergoes a plurality of processing steps, each of the processing steps involves a plurality of processing tools, and each of the wafers is processed by at least one of the processing tools involved in the processing steps. At Step S302, production history data are provided. The production history data are associated with the respective tools processing the respective wafers at the respective processing steps. At Step S304, at least one measurement is provided. The measurement relates to the wafers at the respective processing steps and at each tool stack run count for the respective tools. At Step S306, a statistical and correlation analysis is conducted based on the history data and the measurement, so as to determine the parameters including Rb, Rg, R1, R2, C1, and C2. At Step S308, the processing tools are ranked based on performance. The performance includes index values relating to the respective processing steps based on a function of the parameters.

In addition, the method may also be implemented as a program product executable by a computer, for example, and provided for semiconductor processing control. The program product includes a non-transitory computer-readable medium and a program is stored in the medium. In addition, a plurality of wafers are processed. Each of the wafers undergoes a plurality of processing steps, each of the processing steps involves a plurality of processing tools, and each of the wafers is processed by at least one of the processing tools involved in the processing steps. The program product includes a computer program configured to obtain production history data. The production history data are associated with the respective tools processing the respective wafers at the respective processing steps. Moreover, at least one measurement data is obtained. The measurement data relates to the wafers at the respective processing steps and at each tool stack run count of the respective tools. A statistical correlation analysis on the production history and the measurement data is carried out to determine the parameters including the bad ratio (Rb) and the good ratio (Rg) of each of the tools, a first bad-to-good probability ratio (R1) of each of the processing tools obtained by dividing Rb by Rg at the tool stack run count, and a second bad-to-good probability ratio (R2) as an overall ratio of the Rb to the Rg of each of the processing tools. A first correlation coefficient (C1) is provided for the measurement data corresponding to the tool stack run count. A second correlation coefficient (C2) is provided for the first bad-to-good probability ratio (R1) corresponding to the tool stack run count. The processing tools are ranked based on the performance. The performance is the index values relating to the respective processing steps based on the function of the parameters. In addition, R1 is incorporated into C2.

In view of the foregoing, the method for determining abnormal equipment of the semiconductor manufacturing system and the program product according to the embodiments of the invention take an additive effect of the tool stack run count into consideration. When the tool deteriorates, the deterioration may become more salient due to the additive effect. Therefore, the suspicious tool may be found effectively.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for determining abnormal equipment of a semiconductor manufacturing system, comprising:
   providing a semiconductor processing control system to perform the following steps:
   processing a plurality of wafers, wherein each of the wafers undergoes a plurality of processing steps, each of the processing steps involves a plurality of processing tools, and each of the wafers is processed by at least one of the processing tools involved in the processing steps;
   providing production history data associated with the respective tools processing the respective wafers at the respective processing steps;
   providing at least one measurement data relating to the wafers at the respective processing steps and at each tool stack run count for the respective tools;
   carrying out a statistical and correlation analysis by a statistical processing unit of the semiconductor processing control system on the production history data and the measurement data to determine a plurality of parameters, comprising: a bad ratio (Rb) and a good ratio (Rg) of each of the tools, a first bad-to-good probability ratio (R1) of each of the processing tools obtained by dividing Rb by Rg at the tool stack run count, a second bad-to-good probability ratio (R2) as an overall probability ratio of Rb to Rg of each of the processing tools, a first correlation coefficient (C1) for the measurement data corresponding to the tool stack run count; and a second correlation coefficient (C2) for R1 corresponding to the tool stack run count; and
   ranking the processing tools by the statistical processing unit of the semiconductor processing control system, based on performance, wherein the performance comprises an index value relating to each of the processing steps based on a function of the parameters, wherein R1 is incorporated into C2.

2. The method for determining abnormal equipment of the semiconductor manufacturing system as claimed in claim 1, wherein the measurement data comprise chip probing (CP) measurement data or wafer acceptance test (WAT) measurement data.

3. The method for determining abnormal equipment of the semiconductor manufacturing system as claimed in claim 1, wherein the index value is calculated based on a function as follows:

$$\frac{Rg/0.5}{[(1+|C1|/0.1)\cdot(1+C2/0.1)\cdot R2]^{Rb/0.5}}.$$

4. The method for determining abnormal equipment of the semiconductor manufacturing system as claimed in claim 1, wherein Rb and Rg correspond to a bad group and a good group, the measurement data of the bad group fall on a first side in a measurement distribution of the statistical and correlation analysis, whereas the measurement data of the good group fall on a second side in the measurement distribution of the statistical and correlation analysis.

5. The method for determining abnormal equipment of the semiconductor manufacturing system as claimed in claim 1, wherein the processing tools are filtered based on Rb or Rg to reduce the number of the processing tools involved in the ranking.

6. The method for determining abnormal equipment of the semiconductor manufacturing system as claimed in claim 5, wherein the processing tools are filtered out when a condition of R2<R1 is met to reduce the number of the processing tools involved in the ranking.

7. The method for determining abnormal equipment of the semiconductor manufacturing system as claimed in claim 6, wherein any of the processing tools whose value of C2 is smaller than or equal to 0 is filtered out.

8. The method for determining abnormal equipment of the semiconductor manufacturing system as claimed in claim 1, further comprising that the semiconductor manufacturing system suspends the processing tool whose performance is determined as bad based on the ranking of performance.

9. A program product, configured to exert a semiconductor processing control system and comprising a non-transitory computer-readable medium storing a program, wherein a plurality of wafers are processed, each of the wafers undergoes a plurality of processing steps, each of the processing steps involves a plurality of processing tools, each of the wafers is processed by at least one of the processing tools involved in the processing steps, and the program product comprises a computer program used by the semiconductor processing control system configured to carry out:
  obtaining production history data associated with the respective tools processing the respective wafers at the respective processing steps;
  obtaining at least one measurement data relating to the wafers at the respective processing steps and at each tool stack run count of the respective tools;
  carrying out a statistical and correlation analysis by a statistical processing unit of the semiconductor processing control system on the production history data and the measurement data to determine a plurality of parameters, comprising: a bad ratio (Rb) and a good ratio (Rg) of each of the tools, a first bad-to-good probability ratio (R1) of each of the processing tools obtained by dividing Rb by Rg at the tool stack run count, a second bad-to-good probability ratio (R2) as an overall probability ratio of Rb to Rg of each of the processing tools, a first correlation coefficient (C1) for the measurement data corresponding to the tool stack run count; and a second correlation coefficient (C2) for R1 corresponding to the tool stack run count; and
  ranking the processing tools by the statistical processing unit of the semiconductor processing control system, based on performance, wherein the performance comprises an index value relating to each of the processing steps based on a function of the parameters, wherein R1 is incorporated into C2.

10. The program product as claimed in claim 9, wherein the measurement data comprise chip probing (CP) measurement data or wafer acceptance test (WAT) measurement data.

11. The program product as claimed in claim 9, wherein the index value is calculated based on a function as follows:

$$\frac{Rg/0.5}{[(1+|C1|/0.1)\cdot(1+C2/0.1)\cdot R2]^{Rb/0.5}}.$$

12. The program product as claimed in claim 9, wherein Rb and Rg correspond to a bad group and a good group, the measurement data of the bad group fall on a first side in a measurement distribution of the statistical and correlation analysis, whereas the measurement data of the good group fall on a second side in the measurement distribution of the statistical and correlation analysis.

13. The program product as claimed in claim 9, wherein the processing tools are filtered based on Rb or Rg to reduce the number of the processing tools involved in the ranking.

14. The program product as claimed in claim 13, wherein the processing tools are filtered out when a condition of R2<R1 is met to reduce the number of the processing tools involved in the ranking.

15. The program product as claimed in claim 14, wherein any of the processing tools whose value of C2 is smaller than or equal to 0 is filtered out.

16. The program product as claimed in claim 14, wherein the processing tool whose performance is determined as bad based on the ranking of performance is suspended.

* * * * *